Nov. 17, 1964     H. N. HARMON     3,157,775
RADIANT HEATER
Filed May 3, 1961     3 Sheets-Sheet 1
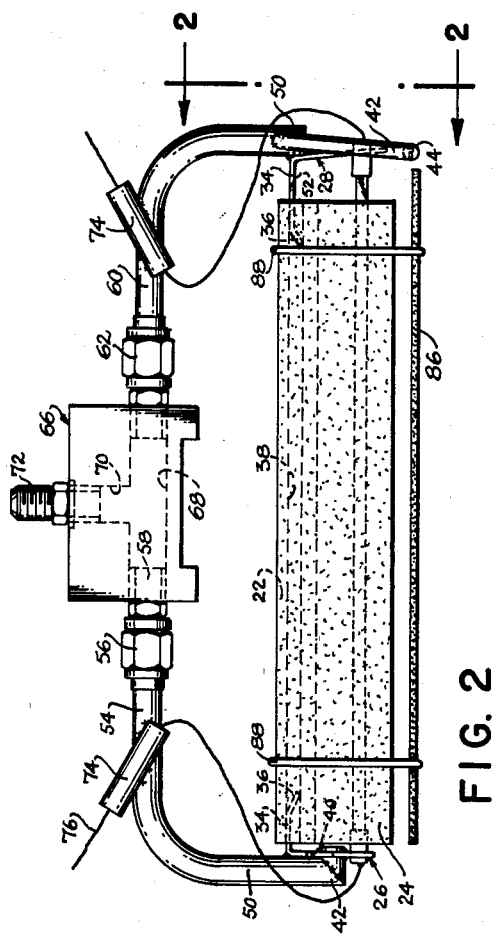
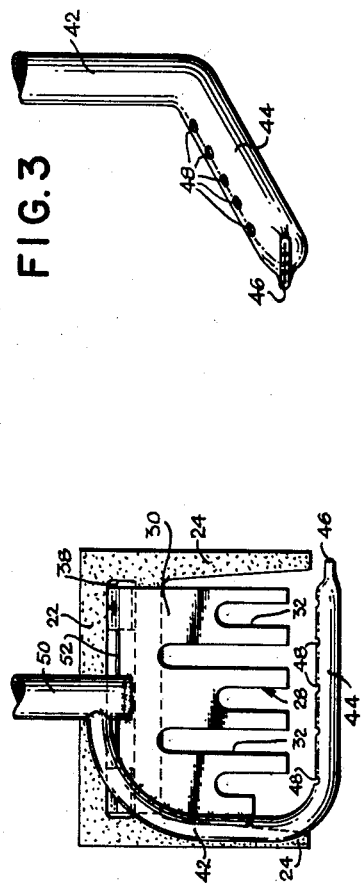
INVENTOR.
Henry Neil Harmon
BY
TW Secrest Nov. 17, 1964   H. N. HARMON   3,157,775
RADIANT HEATER
Filed May 3, 1961   3 Sheets-Sheet 2
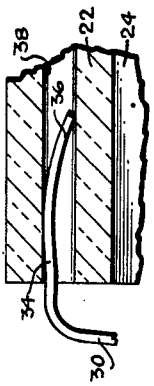
FIG. 5
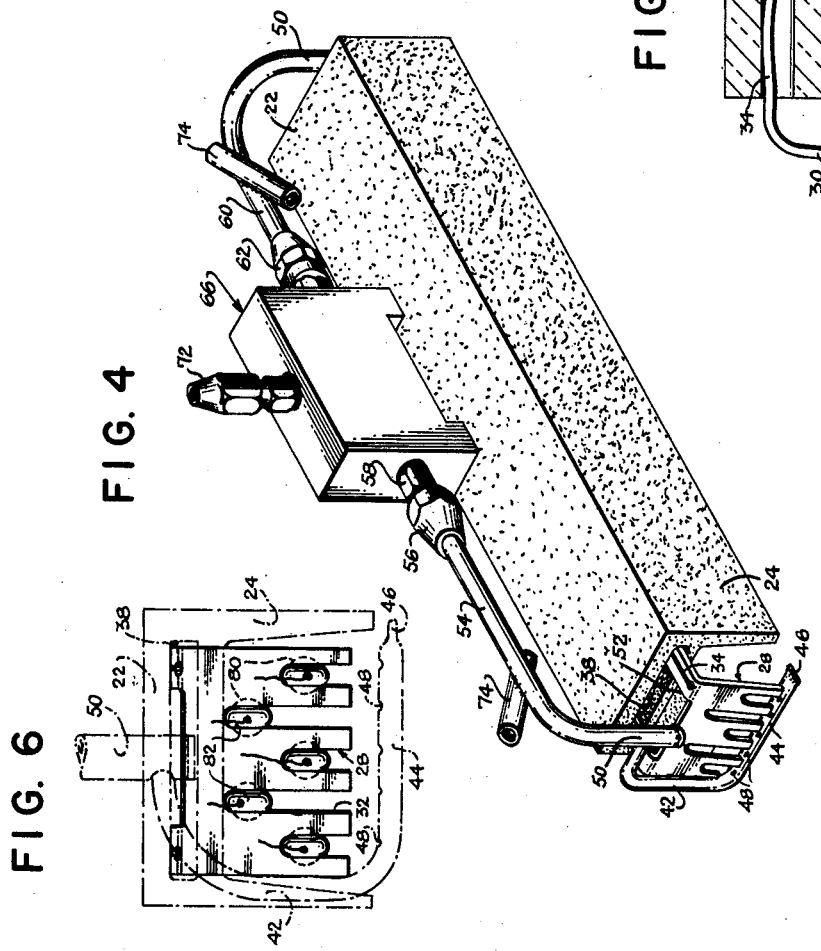
INVENTOR.
Henry Neil Harmon
BY
TW Secrest Nov. 17, 1964
H. N. HARMON
3,157,775
RADIANT HEATER
Filed May 3, 1961
3 Sheets-Sheet 3
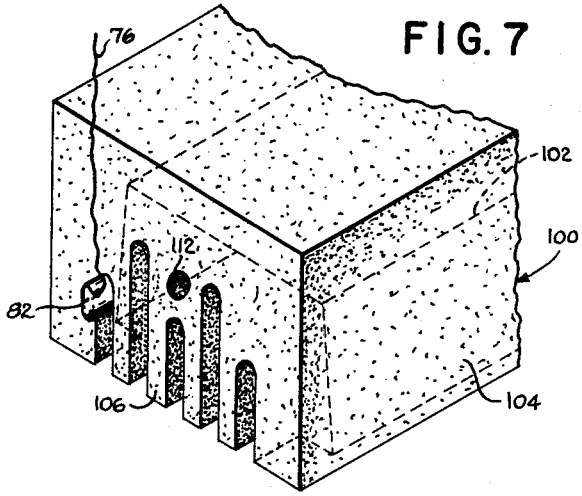
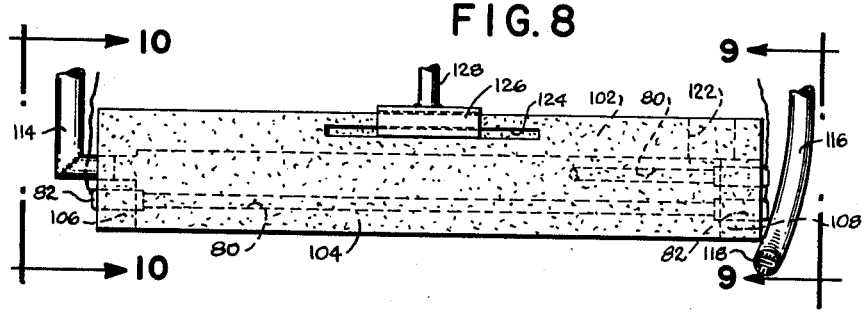
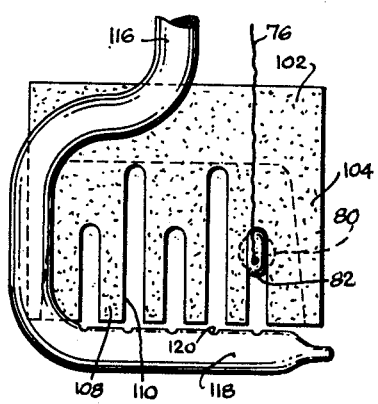
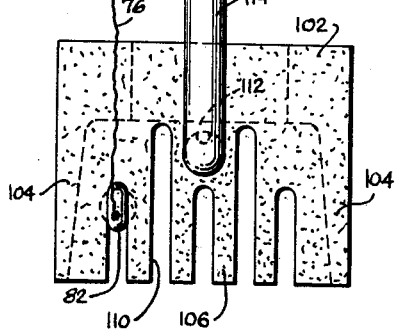
INVENTOR.
Henry Neil Harmon
BY
TW Secrest

United States Patent Office

3,157,775
Patented Nov. 17, 1964

3,157,775
RADIANT HEATER
Henry Neil Harmon, Seattle, Wash., assignor to Pyrometrics, Inc., Seattle, Wash., a corporation of Washington
Filed May 3, 1961, Ser. No. 107,407
9 Claims. (Cl. 219—347)

This invention relates to a radiant heater capable of maintaining a relatively high temperature for a relatively long period of time.

Radiant heater lamps having the ability to heat an object to a temperature of approximately 2000° F. do not have a long heating life. For example, with previously commercially available heaters, the heating life has been less than approximately two hours. One of the reasons for the short life at these high temperatures was the fact that the lamp itself was heated to a high temperature and there was insufficient cooling to maintain the temperature of the lamp at a low temperature. Naturally, the lamp would be heated by the filament; and, also, the lamp was heated by radiation from the object being heated. An object at a temperature of approximately 2000 °F. may give off a considerable amount of radiation and thereby heat the heating lamp. The failure of the radiant heater occurred in both the lamp end seals where the electrode passed from the inside of the lamp to the outside of the lamp. Also, failure occurred in the reflectors for the lamp. On the commercially available lamps there was an air cooling system which, to a degree, cooled the lamps and especially the quartz tubes surrounding the filament in the lamp. The air cooling system employed on these commercially available heaters was of such a nature as to partially cool the object being heated. More particularly, the air was blown from the radiant heater lamp onto the object being heated. As a result, the temperature of the object was lowered.

With this limitation on the ability of radiant heater lamps to maintain a relatively high temperature for a relatively long period of time, I have invented a radiant heater which can maintain a high temperature of approximately 2800°–3000° F. or higher, for a relatively long period of time such as ten hours or even longer. Accordingly, an advantage of this radiant heater lamp is its ability to maintain a relatively high temperature for a relatively long period of time; further, for the lamp itself to operate at an electrical potential much higher than the rated voltage, for example, at approximately two times the rated voltage. This is possible because of the cooling means provided for the radiant heater lamp.

For a more specific description of the invention and its advantages, reference is made to the following drawings detailed specification of the radiant heater lamp and the appended claims.

In the drawings:

FIGURE 1 is a side elevational view of a specific embodiment of the invention constructed in accordance with the preferred teaching thereof.

FIGURE 2, taken on line 2—2 of FIGURE 1, shows an end view of the radiant heater with an end seal and a tube for cooling the electrodes attached to the heating lamps.

FIGURE 3 is a view looking down on the tube and the holes therein, and which tube is used for blowing cooling gas on the electrodes of the lamps.

FIGURE 4 is an isometric view looking down on the radiant heater and illustrates the arrangement of parts and the cooling tube, the end seal and the passageway in the end seal for allowing hot gases to escape from the interior of the reflector and, also, from around the end seals and the electrodes.

FIGURE 5 is a fragmentary view illustrating the manner and means in which an end seal is attached to the reflector.

FIGURE 6 is an end view illustrating in phantom the reflector and the cooling means, and in solid line, the end seal and the electrodes in the slots in the end seal.

FIGURE 7 is a view looking down on one end of another embodiment of the reflector.

FIGURE 8 is a side view of the reflector and illustrates the piping for conveying cooling gas to the electrodes and the lamps in the reflector.

FIGURE 9 is an end view of the reflector and the cooling means and illustrates the arrangement for blowing cooling gas over the electrodes in the slots and the end seal; and, FIGURE 10 is an end view of another end of the reflector and illustrates the end seal, the slots in the end seal and the piping for conveying cooling gas to the interior of the reflector and the lamps therein.

Referring to the drawings, it is seen that the invention comprises a radiant heater 20 having a reflector which comprises a base 22 and two spaced-apart sides 24. The base 22 and the two depending sides 24 define a channel having two open ends. Overlying each open end of the channel is a first end seal 26 and a second end seal 28.

Each of the end seals 26 and 28 are made from sheet metal such as stainless steel. The end seals comprise a flat base 30 having recesses 32. Some of the recesses 32 are of a short length and some are of a long length. In FIGURES 2, 4 and 6, it is seen that there are five recesses. One end of the end seal, reference numeral 34, is bent at approximately right angles to the flat plate 30 and the end of 34 is bent inwardly slightly at 36 so as to overlie 30.

In the base 22 there is a longitudinal passageway 38. The tongue 34 and the bent tip 36 of the end seals fit into the passageway 38 so as to position the end seal with respect to the open end of the channel.

The end seal 26 has a central portion cut away so as to define a passageway 40. Projecting through this passageway 40 from the outside of the end seal 26 to the channel of the reflector is a tube 42. The end of the tube 42 is directed toward the other end of the reflector or the other end seal 28 so as to blow a cooling gas toward the other end seal 28. The tube 42 is welded to 30 so as to have a unitary structure.

The end seal 28 does not have a passageway 40 therein. However, a tube 42 runs around one side of the end seal and then curves around the bottom of the same at 44. The end of 44 is pinched off at 46 or sealed at 46. On one face or the upper surface of 44, and that surface directed toward the end seal 28, are a number of passageways 48 which pass through the wall of 44 so as to allow a gas to pass from the interior of the tube to the exterior of the tube.

The tube 42, at its upper end, connects with a pipe 50. The tube 42 is welded to the pipe 50; and, in turn, the lower end of the pipe 50 is welded to the end seal 28 so as to make an integral unit.

The end seal 28, instead of having a solid lip 34, has a central portion removed. This leaves two prongs for projecting into the passageway 38. These prongs, which are the equivalent of lip 34, are so bent as to space the end seal 28 away from the end of the reflector. In this manner the base 22 of the reflector, the two prongs, the upper part of the end seal 28 define a passageway 52. A passageway 52 allows hot air or hot gas to rise from the channel part of the reflector and thereby escape from the channel.

The tube 52 rises upwardly from the end seal 26 and curves into the tube 54. The tube 54 connects with a couple 56. The couple 56 connects with an externally threaded nipple 58.

The pipe 50 curves into a straight section 60 and which is connected with a couple 62. The couple 62 connects with an externally threaded nipple 64. The nipples 58 and 64 connect with a block 66. This block has a longitudinal passageway 68 and the ends of which passageway are tapped to receive the threaded nipples 58 and 64. The passageway 68 connects with a feeder passageway 70. The passageway 70 is tapped to receive a nipple 72. The block 66 is an electrically insulating block or is of dielectric material.

Welded to the pipe 54 and welded to the pipe 60 are directional pipes 74. These directional pipes 74 position the lead-in wires 76. The lead-in wires 76 connect with the radiant heater lamps 80. The lamps 80 comprise a quartz tube having a tungsten filament. The filament passes through the end seal of the tube and connects with with an external electrode 82. The external electrode 82 slips into a slot 32 in one of the end seals 26 or 28. When these lamps have been used in previous radiant heaters, the electrodes 82 have not been able to stand the high heat realized, approximately 2000° F. for a period of time greater than about one or two hours. As a consequence the electrode 82 has failed with the failure of the radiant heater itself.

An auxiliary piece of equipment for the radiant heater lamp is a quartz plate 86. This quartz plate 86 is positioned on the radiant heater 20 by means of asbestos string 88.

Referring to the operation of this radiant heater, it is seen that the reflector 20 and the block 66 are of a dielectric insulating material. The reflector 20 may be of a refractory material such as a silicon dioxide, magnesium oxide, zirconium oxide or other desirable refractory materials. One of the refractory materials I have used for a reflector comprises approximately 99.8 percent silicon dioxide and .2 of one percent aluminium oxide. The block 66 may be of a refractory material such as above described or it may be of a cement-asbestos composition. The cement-asbestos composition is of a hard rigid material and is an insulator. The end seals 26 and 28 and the associated piping and tubing may be of stainless steel. As is readily realized, the electrodes 82 are in electrical contact with the end seals 26 and 28. Therefore, the end seals and associated piping and tubing are electrically "hot." Because of this it is necessary to have a block 66 and a reflector 20 as electrical insulators.

Without the use of quartz shields 86, it is possible to maintain a temperature of approximately 2400° F. for a relatively long period of time. This relatively long period of time is at least two and maybe ten hours. The life of the heating lamps 80 varies from at least two hours and have been recorded for a life as long as 100 hours under certain conditions.

The lamps are rated for 230 volts. I have operated these lamps at 440 volts and with a three phase source of electricity. It is hereby seen that the operation is at approximately twice the rated voltage and is for a longer period of time than previously attainable with other radiant heaters.

With my radiant heater it is possible to cool the electrodes 82 and the lamp 80 so as to maintain a longer life for the heating lamp. This is realized by the cooling pipe 44 having upwardly directed orifices 48. With the electrodes in position in the end seals 26 and 28, the cooling gas is forced through the pipe 44 and out of the nozzles 48 and onto the electrodes 82. The gas after passing over the electrodes 82 rises upwardly through the passageway 52. In this manner the hot gas is removed away from the electrodes 82 positioned in the end seal 28. With respect to the end seal 26, it is seen that the hot gas is blown through the orifice 40 in a path substantially parallel to the heating lamp 80 and, also substantially parallel to the base of the reflector. The heating lamp 80 and the base of the reflector are spaced apart so as to allow air to circulate. With the cooling gas being blown out of the orifice or nozzle 40, it passes around the tubes 80 and toward the end seal 28. Upon passing this distance along the reflector 20 and, also, the tubes 80, it reaches the passageway 52 and rises upwardly away from the reflector. With the cooling gas being forced out of the orifice 40, it lessens the pressure on the reflector side of the end seal 26 so that cooling gas is thereby forced to pass the electrodes 82 and which electrodes are positioned in the slots in the end seal 26. In this manner the electrodes 82 in the end seal 26 are cooled. Further, with the cooling gas flowing in the reflector between the sides 24 and around the tubes 80, there is created a partial vacuum, see Bernoulli's theorem. As a result, the cooling gas below the reflector is forced upwardly, due to the differential in pressure, and flows around the tubes 80 so as to cool them.

Of assistance in the cooling of electrodes 82 and the lamps 80 is a construction of the reflector 20 having a base and two depending sides. As a result, the reflector may be considered to be of a funnel or a channel configuration. This assists in forming a well-defined path for the cooling gases as they flow from the orifice 40 toward the end seal 28. The cooling gas flows longitudinally with respect to the lamp 80 and the reflector 20. The end seals 26 and 28 and the associated piping tubing also assist in cooling the electrodes 82. As is recalled, the end seals and the piping are of stainless steel and thereby conduct heat away from the end seals. The cooling gas flows through the piping and is of a much lower temperature than the end seals 26 and 28. By flowing through the piping it takes heat from the piping so as to maintain the pipes at a lower temperature than the electrodes.

With the use of a quartz shield 86, I have been able to melt platinum with my radiant heater. The melting point of platinum is approximately 3190° F. or 1775° C. The quartz shield 86 is held in position by an asbestos string 88 or other suitable means. The shield 86 is positioned slightly below the end edges of the sides 24. The spacing may be a quarter of an inch or even a half inch. The reason for this is to allow air to enter between the quartz shield and the end edges of the sides 24. As is recalled, due to the longitudinal flow of the air in the reflector, there is created a differential in pressure whereby the air in the funnel is at a slightly lower pressure than the air outside the funnel. Therefore, the cooler air outside the funnel enters into the funnel or into the funnel of the reflector and cools the lamps 80.

Turning now to the radiant heater shown in FIGURES 7, 8, 9 and 10, it is seen that this heater is made mainly of a refractory material and not of a combination of refractory material and metal. One of the reasons for this is the insulation of the electrodes. This radiant heater 100 comprises a base 102, two sides 104 and ends 106 and 108. It is seen that the base, the sides and the end seals define a cup or a cavity for holding the lamp.

The end seals 106 and 108 contain a number of slots 110. These slots receive the electrodes 82 of the lamps 80.

The end seal 106 has a central passageway 112. Connecting with this passageway 112, and integral with the end seal 106, is a pipe or tube 114. The pipe 114 is of refractory material the same as the reflector 100. The pipe 114 is directed so as to blow cooling gas substantially parallel to the lamps 80 for the base of the reflector. In other words, the cooling gas is blown longitudinally with respect to the lamps 80.

The end seal 108 comprises the slots 110 for receiving the electrodes. Also, in association with this end seal 108 is a curving tube 116 of refractory material such as the material used in the reflector. This pipe 116 terminates in a straight portion 118 near the end seal 108. In the upper surface are a number of holes or apertures 120. These are positioned to direct a cooling gas onto the electrodes 82. The tubing 114 and 116 connects with the source of cooling gas such as air under pressure.

In the base 102 and overlapping the end seal 108 is a passageway 122. This passageway may be considered to be the equivalent of a chimney. The chimney 122 allows the hot gas to escape from the inside of the reflector.

In each side 104 of the reflector there is a recess 124. This recess receives the legs of a clamp 126. The clamp is attached to a pedestal or rod 128. The rod 128 and the clamp 126 position the radiant heater.

The electrodes 82 are connected to a conductor 76 which connects it with a source of electricity. The lamps 80 are held in position in both of the reflectors 20 and 100 by means of the conductors 76. These lamps are light in weight and can easily be held by means of the lead-in wires 76.

The manner of operation of the radiant heater 100 is substantially the same as for the radiant heater 20. That is, a cooling gas is blown upwardly through holes 120 and pipe 118 so as to cool the electrodes 82 of the lamps. These cooling gases pass upwardly around the slots in the end seal 108 and through the chimney 122.

The cooling gas is blown in a longitudinal direction from the pipe 114 and the end seal 106. This cooling gas passes around the lamps 80 so as to lessen the gas pressure in the reflector. With this decrease in pressure, the gases from the outside flow into the reflector and around the lamps 80 and out through the chimney 122. To assist in allowing the flow of gases around the lamp 80, the lamps are spaced apart from the base of the reflector.

If a quartz plate 86 is positioned about a quarter of an inch or a half inch below the reflector, it is possible to achieve relatively high temperatures of about at least 3200° F. or higher. Without the use of the quartz plate 86, it is possible to realize temperatures of about 2400° F. The lamps in this radiant heater can be used for at least two hours and many times for as many as 10 or 100 hours. Again, it is to be recalled that the voltage applied to the lamp is approximately twice the normal rated voltage. More particularly, the rated voltage for the lamp is approximately 230 volts. The applied voltage can be as much as 440 or 450 volts off the three-phase source of electricity. The refractory and the dielectric nature of the reflectors and tubing eliminate many of the precautions necessary for electrical insulations.

Having presented my invention it is to be understood that minor variations and changes in the construction of radiant heaters may be made and still be within the scope and intent of my invention. For example, a different arrangement may be used for holding the lamps in the end seals. A positive clamping means may be used instead of suspension by the lead-in wires. Also, the different means for holding the radiant heater may be employed and still be within the scope and the intent of the claims.

What I claim is:

1. A radiant heater, said heater comprising a reflector and a lamp, said reflector having a base and two spaced-apart sides, a first end seal and a second end seal, said lamp being of a rod-like configuration and having a longitudinal dimension longer than its cross-sectional dimension, said lamp having an external electrode at each end, means for supporting the lamps by the end seals, a first tube positioned adjacent to the first end seal and having means to direct a cooling gas over the external electrode near the first end seal, a second tube connecting with the second end seal and positioned to direct a cooling gas toward the first end seal and in a path substantially parallel to the base of the reflector and to the lamp, said lamp being spaced apart from the base of the reflector so as to allow gas to flow around the lamp, and said first and second tubes connecting with a source of cooling gas.

2. A radiant heater, said heater comprising a reflector and a lamp, said reflector having a base and two spaced-apart sides, a first end seal and a second end seal, said lamp being of a rod-like configuration and having a longitudinal dimension longer than its cross-sectional dimension, said lamp having an external electrode at each end, means for supporting the lamps by the end seals, a first tube positioned adjacent to the first end seal and having means to direct a cooling gas over the external electrode near the first end seal, a second tube connecting with the second end seal and positioned to direct a cooling gas toward the first end seal and in a path substantially parallel to the base of the reflector and to the lamp, said lamp being spaced apart from the base of the reflector so as to allow gas to flow around the lamp, said first and second tubes connecting with a source of cooling gas, and a translucent shield in front of the lamp and spaced apart from the base so that the lamp is positioned between the base, the shield and the two spaced-apart sides.

3. A radiant heater, said heater comprising a reflector and a lamp, said reflector having a base and two spaced-apart sides so as to define a channel having a first end and a second end, said lamp being of a rod-like configuration and having a longitudinal dimension larger than its cross-sectional dimension, said lamp having an external electrode at each end, means for positioning the lamp in the channel with an external electrode near each of said first and second ends, a first tube positioned adjacent to the first end and having means to direct a cooling gas over the external electrode near the first end, a second tube juxtapositioned near the second end and positioned to direct a cooling gas toward the first end and in a path substantially parallel to the base of the reflector and to the lamp, said lamp being spaced apart from the base of the reflector so as to allow gas to flow around the lamp, and said first and second tubes connecting with a source of cooling gas.

4. A radiant heater, said heater comprising a reflector and a lamp, said reflector having a base and two spaced-apart sides and a first end and a second end, said lamp having an external electrode at each end, means for positioning the lamp in the reflector near the base and between the two spaced-apart sides with an external electrode near each of said first and second ends, a first tube positioned adjacent to the first end and having means to direct a cooling gas over the external electrode near the first end, a second tube juxtapositioned near the second end and positioned to direct a cooling gas toward the first end and in a path substantially parallel to the base of the reflector and to the lamp, said lamp being spaced apart from the base of the reflector so as to allow gas to flow around the lamp, and said first and second tubes connecting with a source of cooling gas.

5. A radiant heater, said heater comprising a reflector and a lamp, said reflector having a base and two spaced-apart sides and a first end and a second end, said lamp having an external electrode at each end, means for positioning the lamp in the reflector near the base and between the two spaced-apart sides with an external electrode near each of said first and second ends, a first tube positioned adjacent to the first end and having means to direct a cooling gas over the external electrode near the first end, a second tube juxtapositioned near the second end and positioned to direct a cooling gas toward the first end and in a path substantially parallel to the base of the reflector and to the lamps, said lamp being spaced apart from the base of the reflector so as to allow gas to flow around the lamp, said first and second tubes connecting with a source of cooling gas, and a translucent shield in front of the lamp and spaced apart from the base so that the lamp is positioned between the base, the shield and the two spaced-apart sides.

6. A radiant heater, said heater comprising a reflector and a lamp, said reflector being of a dielectric refractory material, said reflector having a base and two spaced-apart sides so as to define a channel having two open ends, a first end seal covering one open end and a second end seal covering the other open end, said end seals being capable of conducting heat, means connecting the end seals and the reflector, said lamp being of a rod-like configuration and having a longitudinal dimension larger than its cross-sectional dimension, said lamp having an external electrode at each end, a recess in each of said end seals for housing one of the electrodes, said first end seal being spaced away from the end of the reflector so as to define a passageway between the end seal and the reflector to allow air to flow therethrough, a first tube positioned adjacent to one end of the first end seal and having means to blow a cooling gas over the first end seal and the electrode, said first tube being a conductor of heat and electricity, a second tube connecting with the second end seal and positioned to direct a cooling gas toward the first end seal and in a path substantially parallel to the base of the reflector and to the lamp, said lamp being spaced apart from the base of the reflector so as to allow gas to flow around the lamp, said second tube being a conductor of heat and electricity, said first and second tubes connecting with passageways in a dielectric insulating block, and a translucent shield in front of the lamp and spaced apart from the base so that the lamp is positioned between the base, the shield and the two spaced-apart sides.

7. A radiant heater, said heater comprising a reflector and a lamp, said reflector having a base and two spaced-apart sides so as to define a channel having two open ends, a first end seal covering one open end and a second end seal covering the other open end, means connecting the end seals and the reflector, said lamp being of a rod-like configuration and having a longitudinal dimension larger than its cross-sectional dimension, said lamp having an external electrode at each end, means for supporting the lamps by the end seals, said first end seal being spaced away from the end of the reflector so as to define a passageway between the end seal and the reflector to allow gas to flow therethrough, a first tube positioned adjacent the first end seal and having means to direct a cooling gas over the external electrode near the first end seal, a second tube connecting with the second end seal and positioned to direct a cooling gas toward the first end seal and in a path substantially parallel to the base of the reflector and to the lamp, said lamp being spaced apart from the base of the reflector so as to allow gas to flow around the lamp, and said first and second tubes connecting with a source of cooling gas.

8. A radiant heater, said heater comprising a reflector and a lamp, said reflector having a base and two spaced-apart sides and two spaced-apart first and second end seals bridging the two spaced-apart sides so as to define a cup, said reflector being of a dielectric refractory material, said lamp being of a rod-like configuration and having a longitudinal dimension larger than its cross-sectional dimension, said lamp having an external electrode at each end, means for supporting the lamps by the end seals, a passageway in the reflector, said passageway positioned so as to allow gas to escape from the reflector in the vicinity of the first end seal, a first tube positioned adjacent the first end seal and having means to direct a cooling gas over the external electrode near the first end seal, a second tube positioned to direct a cooling gas away from the second end seal and toward the first end seal in a path substantially parallel to the base of the reflector and to the lamp, said lamp being spaced apart from the base of the reflector so as to allow gas to flow around the lamp.

9. A radiant heater, said heater comprising a reflector and a lamp, said reflector being of a dielectric refractory material, said reflector having a base and two spaced-apart sides so as to define a channel having two open ends, a first end seal covering one open end and a second end seal covering the other open end, said end seals being capable of conducting heat, means connecting the end seals and the reflector, said lamp being of a rod-like configuration and having a longitudinal dimension larger than its cross-sectional dimension, said lamp having an external electrode at each end, a recess in each of said end seals for housing one of the electrodes, said first end seal being spaced away from the end of the reflector so as to define a passageway between the end seal and the reflector to allow air to flow therethrough, a first tube positioned adjacent one end of the first end seal and having means to blow a cooling gas over the first end seal and the electrode, said first tube being a conductor of heat and electricity, a second tube connecting with the second end seal and positioned to direct a cooling gas toward the first end seal and in a path substantially parallel to the base of the reflector and to the lamp, said lamp being spaced apart from the base of the reflector so as to allow gas to flow around the lamp, said second tube being a conductor of heat and electricity, and said first and second tubes connecting with passageways in a dielectric insulating block.

References Cited in the file of this patent
UNITED STATES PATENTS

| | | |
|---|---|---|
| 2,091,820 | Kiefer | Aug. 31, 1937 |
| 2,278,844 | Francis et al. | Apr. 7, 1942 |
| 2,844,699 | Miskella | July 22, 1958 |
| 3,509,086 | Pedersen | Oct. 16, 1962 |